(12) United States Patent
Shchur et al.

(10) Patent No.: US 10,819,884 B2
(45) Date of Patent: Oct. 27, 2020

(54) METHOD AND DEVICE FOR PROCESSING MULTIMEDIA DATA

(71) Applicant: Samsung Electronics Co., Ltd, Suwon-si (KR)

(72) Inventors: Oleksandr Shchur, Kyiv (UA); Sun-Kyung Kim, Suwon-si (KR); Yevgen Yakishyn, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/489,626

(22) PCT Filed: Feb. 28, 2018

(86) PCT No.: PCT/KR2018/002476
§ 371 (c)(1),
(2) Date: Aug. 28, 2019

(87) PCT Pub. No.: WO2018/160007
PCT Pub. Date: Sep. 7, 2018

(65) Prior Publication Data
US 2020/0028993 A1    Jan. 23, 2020

(30) Foreign Application Priority Data

Feb. 28, 2017   (KR) .................. 10-2017-0026767

(51) Int. Cl.
*H04N 5/04* (2006.01)
*H04N 19/91* (2014.01)
*G06F 16/483* (2019.01)

(52) U.S. Cl.
CPC ............. *H04N 5/04* (2013.01); *G06F 16/483* (2019.01); *H04N 19/91* (2014.11)

(58) Field of Classification Search
None
See application file for complete search history.

(56) References Cited

U.S. PATENT DOCUMENTS 7,409,407 B2   8/2008   Radhakrishnan et al.
8,204,121 B2   6/2012   Feng et al.
9,262,521 B2   2/2016   Kim et al.
(Continued)

FOREIGN PATENT DOCUMENTS

EP     2669893 A2    12/2013
JP   2003-263162 A    9/2003
(Continued)

OTHER PUBLICATIONS

European Patent Office, "Supplementary European Search Report," Application No. EP 18760912.8, dated Dec. 18, 2019, 9 pages.
(Continued)

*Primary Examiner* — Edemio Navas, Jr.

(57) ABSTRACT

Disclosed is a method for searching multimedia data for a highlighted interval, comprising the steps of: parsing the multimedia data into at least one frame; partially decompressing the at least one frame; extracting at least one metadata parameter from the at least one partially decompressed frame; and determining a highlighted interval of the multimedia data based on the at least one metadata parameter.

16 Claims, 16 Drawing Sheets

(56) References Cited

U.S. PATENT DOCUMENTS

| | | | |
|---|---|---|---|
| 2005/0020223 A1* | 1/2005 | Ellis | H04B 1/20 |
| | | | 455/186.1 |
| 2006/0210157 A1 | 9/2006 | Agnihotri et al. | |
| 2007/0174274 A1* | 7/2007 | Kim | G06F 16/68 |
| 2013/0325154 A1* | 12/2013 | Oh | G10L 21/14 |
| | | | 700/94 |
| 2016/0188622 A1* | 6/2016 | Sharangpani | G06F 16/1744 |
| | | | 707/693 |

FOREIGN PATENT DOCUMENTS

| | | |
|---|---|---|
| JP | 2005-331940 A | 12/2005 |
| JP | 2011-059504 A | 3/2011 |
| KR | 10-2013-0057868 A | 6/2013 |
| KR | 10-2013-0058939 A | 6/2013 |
| WO | 2007020544 A2 | 2/2007 |

OTHER PUBLICATIONS

International Search Report dated Jun. 7, 2018 in connection with International Patent Application No. PCT/KR2018/002476, 2 pages.
Written Opinion of the International Searching Authority dated Jun. 7, 2018 in connection with International Patent Application No. PCT/KR2018/002476, 7 pages.

* cited by examiner

Example MP3 Header:

| | | | | | | | | |
|---|---|---|---|---|---|---|---|---|
| | F | F | F | B | A | 0 | 4 | 0 |

Colour-coding shows binary bit mapping to hexvalues below

| Bits | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| Binary | 1 | 1 | 1 | 1 | 1 | 1 | 1 | 1 | 1 | 1 | 1 | 1 | 1 | 0 | 1 | 1 | 1 | 0 | 1 | 0 | 0 | 0 | 0 | 0 | 0 | 1 | 0 | 0 | 0 | 0 | 0 | 0 |
| Hex | F | | | | F | | | | F | | | | B | | | | A | | | | 0 | | | | 4 | | | | 0 | | | |

Detail of an MP3 Header:

| Meaning | MP3 Sync Word | Version | Layer | Error Protection | Bit Rate | Frequency | Pad.Bit | Priv.Bit | Mode | Mode Extension (Used With Joint Stereo) | Copy | Original | Emphasis |
|---|---|---|---|---|---|---|---|---|---|---|---|---|---|
| Value | Sync Word | 1=MPEG | 01=Layer3 | 1=No | 1010=160 | 00=44100Hz | 0 = Frame is not padded | Unknown | 01 = Joint Stereo | 0 = Intensity Stereo Off / 0 = MS Stereo Off | 0 = Not Copy-righted | 0 = Copy of Original Media | 00=None |

FIG.5B

METHOD AND DEVICE FOR PROCESSING MULTIMEDIA DATA

CROSS-REFERENCE TO RELATED APPLICATIONS

This application is a 371 of International Application No. PCT/KR2018/002476 filed on Feb. 28, 2018, which claims priority to Korean Patent Application No. 10-2017-0026767 filed on Feb. 28, 2017, the disclosures of which are herein incorporated by reference in their entirety.

BACKGROUND

1. Field

Various embodiments of the disclosure relate to a method and an apparatus for processing multimedia data.

2. Description of Related Art

Conventionally, a user reproduced multimedia data from a storage medium such as a cassette tape or a compact disc (CD). Therefore, the user could view or listen to only a limited range of multimedia data. Recently, however, with the development of electronic devices, such as a mobile phone and an MP3 player, a user have become able to store and reproduce multiple types of multimedia data as files in electronic devices or to reproduce the multimedia data in real time over the internet. Therefore, a user can select and reproduce multimedia data in a greater variety of manners than conventionally.

Sound source providers provide metadata, such as a producer, a songwriter, a singer, and a genre through which users can identify information on a sound source file. Further, the sound source providers provide users with a sound source pre-listening service. However, the metadata or pre-listening service may not sufficiently aid users in searching for desired music.

Therefore, in the pre-listening service, it is most important to allow the user to listen to the most important part, i.e., a highlighted part, in a music track.

FIG. 1 illustrates reproduction intervals according to sound source tracks for a conventional pre-listening service.

Referring to FIG. 1, each of sound source tracks 1 to 4 includes a reproduction interval for a pre-listening service. The reproduction interval included in each of sound source tracks 1 to 4 is defined by reproduction start points 110, 120, 130, and 140 and reproduction end points 111, 121, 131, and 141 respectively corresponding thereto.

The reproduction start points 110, 120, 130, and 140 are positioned at 0 seconds, or may be fixedly positioned at a specific time point other than 0 seconds.

The use of the method illustrated in FIG. 1 is problematic in that the reproduction start points are fixed and thus a highlighted interval of a sound source track may not accurately correspond to a reproduction interval for a pre-listening service. For example, when a reproduction start point is fixed as a time point one minute after the start of a sound source track, the sound source track interval reproduced for a predetermined time from the reproduction start point may not be a highlighted interval.

It may be possible to use a method for analyzing music data in another manner for determining a highlighted interval in a sound source track. When the method is used, the highlighted interval may be most accurately provided. However, because a multimedia file is stored in a compressed form in a user's device, the compressed data should be decompressed in order to obtain audio data that can be used to search for a pre-listening/highlight/preview part. Decompression in a mobile device takes additional time. Therefore, it is inappropriate to use the method as described above in the mobile device. The reason for this is that, for example, 15 seconds is required to decompress one sound source track having a 5-minute reproduction time in the mobile device.

It may be possible use to a method in which users directly designate a highlighted interval of a sound source track by using another manner for determining a highlighted interval in a sound source track, such as social network services (SNSs), the cloud, a streaming music service, or the like. The method is advantageous in that it is not necessary to search for a highlighted interval because the highlighted interval is designated. However, with the method, it is highly probable that a highlighted interval will not be designated for unpopular/rare music, an Internet connection is required, and an invasion of privacy may occur.

SUMMARY

According to various embodiments of the disclosure, a method and an apparatus for processing multimedia data may be provided.

According to various embodiments of the disclosure, a method and an apparatus for obtaining feature information relating to multimedia data may be provided.

According to various embodiments of the disclosure, a method and an apparatus for quickly searching for a highlighted part from multimedia data may be provided.

According to various embodiments of the disclosure, a method and an apparatus for obtaining tempo characteristics of multimedia data may be provided.

According to various embodiments of the disclosure, a method and an apparatus for obtaining multimedia fingerprinting related to multimedia data may be provided.

According to various embodiments of the disclosure, a method and an apparatus for obtaining at least one among a thumbnail corresponding to a highlighted part of multimedia data, a video source synchronized with an audio source of the multimedia data, and summary information of the multimedia data may be provided.

A method for processing multimedia data according to an embodiment of the disclosure includes: parsing the multimedia data into at least one frame; partially decompressing the at least one frame; extracting at least one metadata parameter from the at least one partially decompressed frame; and obtaining feature information related to the multimedia data by using the at least one metadata parameter.

An apparatus for processing multimedia data according to an embodiment of the disclosure includes: a parser configured to parse the multimedia data into at least one frame; and a controller configured to partially decompress the at least one frame, extract at least one metadata parameter from the at least one partially decompressed frame, and obtaining feature information related to the multimedia data by using the at least one metadata parameter.

BRIEF DESCRIPTION OF THE DRAWINGS

FIG. 5B illustrates an example of a header field of an MP3 frame;

DETAILED DESCRIPTION

Figure 1:
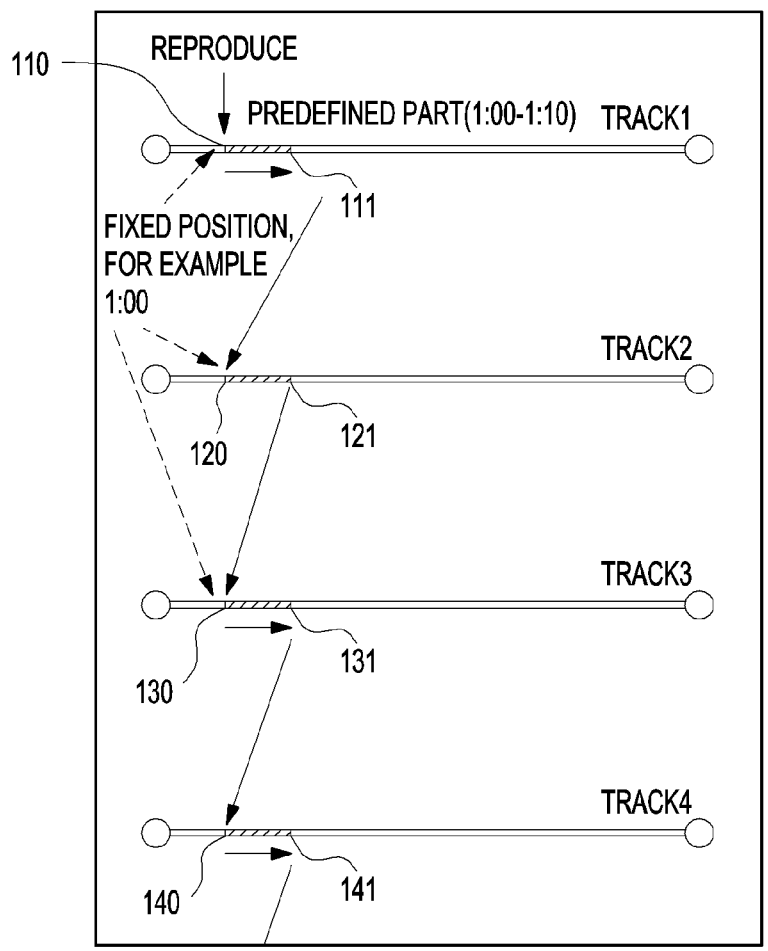
FIG. 1 illustrates reproduction intervals according to sound source tracks for a pre-listening service.

Hereinafter, the operating principle of the disclosure will be described in detail with reference to the accompanying drawings. In the following description of the disclosure, a detailed description of related known functions or configurations will be omitted when it is determined that the detailed description thereof may unnecessarily obscure the subject matter of the disclosure. The terms which will be described below are terms defined in consideration of the functions in the disclosure, and may vary according to users, intentions of the users, or customs. Therefore, the terms should be defined based on the overall description of the specification.

Various embodiments of the disclosure provide a method and a device for processing multimedia data.

Hereinafter, various embodiments of the disclosure will be described based on multimedia data included in a sound source file (e.g. a motion picture expert group (MPEG)-1 audio layer III (MP3) file). However, the multimedia data may be multimedia data included in multimedia files (e.g. a video file such as an avi file) other than the sound source file.

Further, a device according to various embodiment of the disclosure is not limited to a mobile device, and may be a television (TV), a smartphone, a wearable device, Internet-of-Things (IoT) device, headphones, or the like. One of the apparatuses may be referred to as a terminal or device.

According to various embodiments of the disclosure, feature information related to multimedia data may be obtained. In one example, a highlighted part of the multimedia data may be obtained.

Before a description thereof is made, a description will be made of the definition of the highlighted interval and of a curve group defined in a standard related to sound source level measurement.

The highlighted interval indicates a specific part of multimedia data provided by a service for preview or pre-listening of the corresponding multimedia data, and allows a purchaser to be made intuitively aware of content of the multimedia data. The highlighted interval may refer to, for example, an interval in which the sound is the loudest within a specific interval of multimedia data, or an interval in which a sum value of metadata related to sound is largest.

In popular music, a verse is generally formed as an AABB or ABAB rhythm system. If two or more sections of a song have nearly identical melodies and different lyrics, each section is considered to be one verse. However, an introduction part of a song should not be confused with a pre-verse, which is an interlude between starting verses of the song. A chorus includes a main idea or big picture, expressed lyrically or musically. The chorus is repeated throughout the song and has melodies and lyrics which vary little if at all.

In most classical music, the coda and culmination may be defined as the most representative parts. These are normally performed by an orchestra tutti (which is a term indicating not a soloist but the entirety of an orchestra). These are the loudest parts of the music.

Most rock/pop/electronic music has a simple form of verse-chorus. Herein, if A indicates a verse and B indicates a chorus, a melody may be configured by a combination of A and B (for example, AABAABABA, etc.). Normally, B (chorus) is louder in sound than A (verse).

In experimental/ambient/noise/etc. music genres, the culmination may be the loudest/quickest part. In a constant environment track sound, an arbitrary part may be a representative part.

In most genres, the loudest interval may be considered to be a highlighted interval, which is the most representative interval of music.

Figure 2:
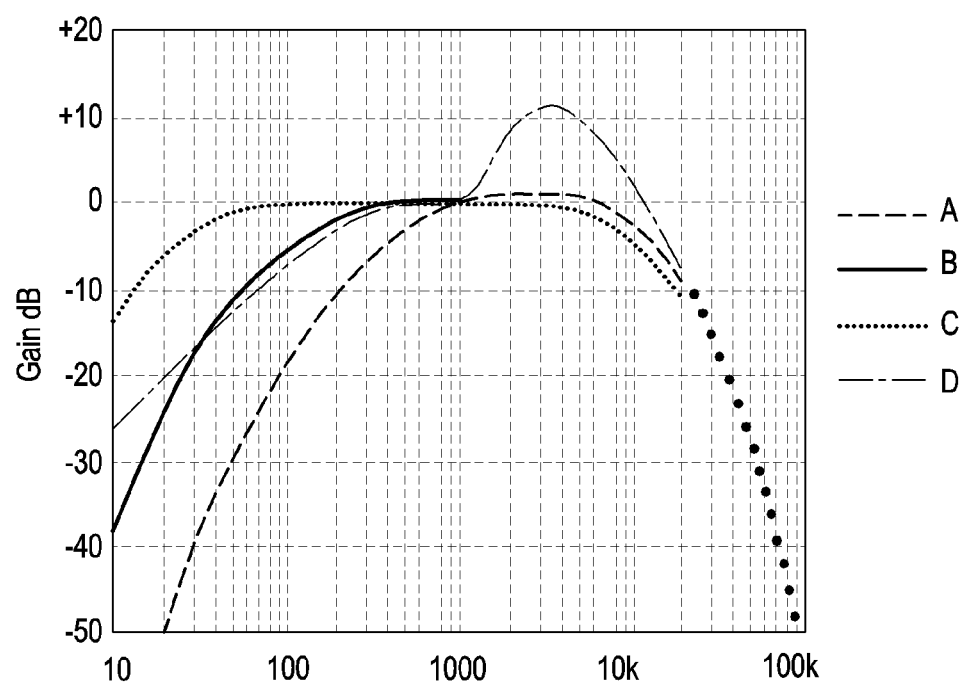
FIG. 2 is a graph illustrating a curve group typically used to measure a sound pressure level.

FIG. 2 is a graph illustrating a curve group typically used to measure a sound pressure level.

Referring to FIG. 2, a graph of various weights usable in sound pressure measurement is defined as a group of curves. Since the human ear is less sensitive to low audio frequencies, weightings may be applied to an instrument-measured sound level in order to calculate the relative loudness perceived by the human ear. For example, A-weighting among four weightings, namely A-weighting, B-weighting, C-weighting, and D-weighting, illustrated in FIG. 2, may be applied.

That is, values listed in an octave or a third octave band are arithmetically added and applied to sound levels that have been measured in dB units. The transverse axis of the graph in FIG. 2 has a log scale unit, and the longitudinal axis of the graph has a dB unit.

Hereinafter, various embodiments of the disclosure will be described in detail with reference to the drawings.

Figure 3:
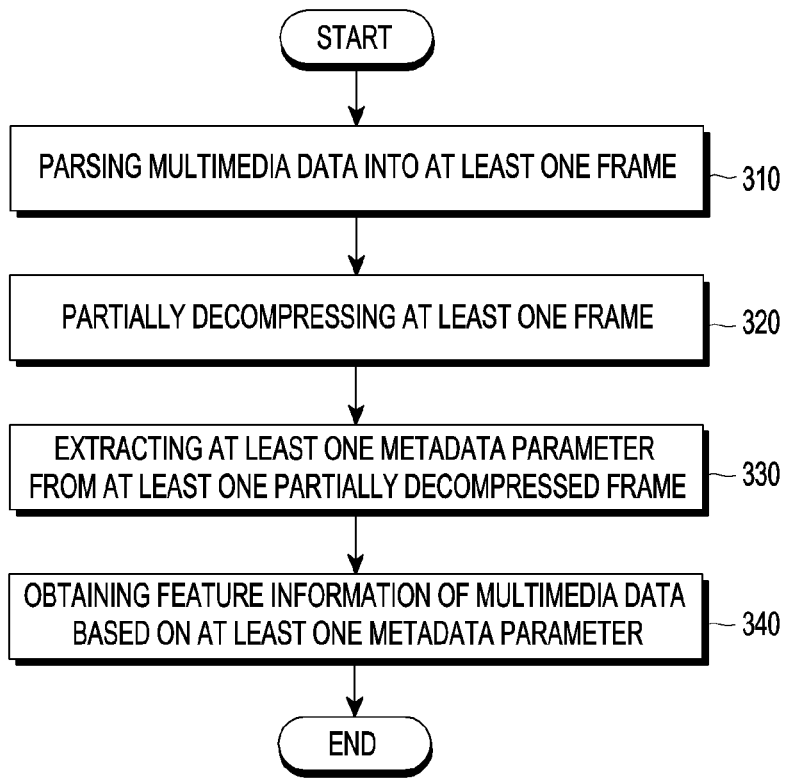
FIG. 3 is a flowchart illustrating a method for searching for a highlighted interval in a multimedia file according to one embodiment of the disclosure.

FIG. 3 is a flowchart illustrating a method for processing multimedia data according to one embodiment of the disclosure.

Referring to FIG. 3, the method for processing multimedia data according to one embodiment of the disclosure includes: parsing encoded multimedia data (or a multimedia file) into at least one frame by a device (310); partially decompressing the at least one frame (320); extracting at least one metadata parameter from the at least one frame that has been partially decompressed (330); and obtaining feature information of the multimedia data based on the at least one metadata parameter (340).

The obtaining of the feature information may include: searching the multimedia data for a highlighted part; obtaining a tempo characteristic of the multimedia data; and obtaining multimedia fingerprinting related to the multimedia data. Further, the obtaining of the feature information may include: obtaining at least one among a thumbnail corresponding to the highlighted part of the multimedia data, a video source synchronized with an audio source of the multimedia data, and summary information of the multimedia data.

As described above, as the encoded multimedia data is parsed into at least one frame, the multimedia data formed as a stream which is merely a code may be divided into meaningful frame units. Meanwhile, as described below, a method according to one embodiment of the disclosure may be applied to encoded multimedia data.

Figure 4A:
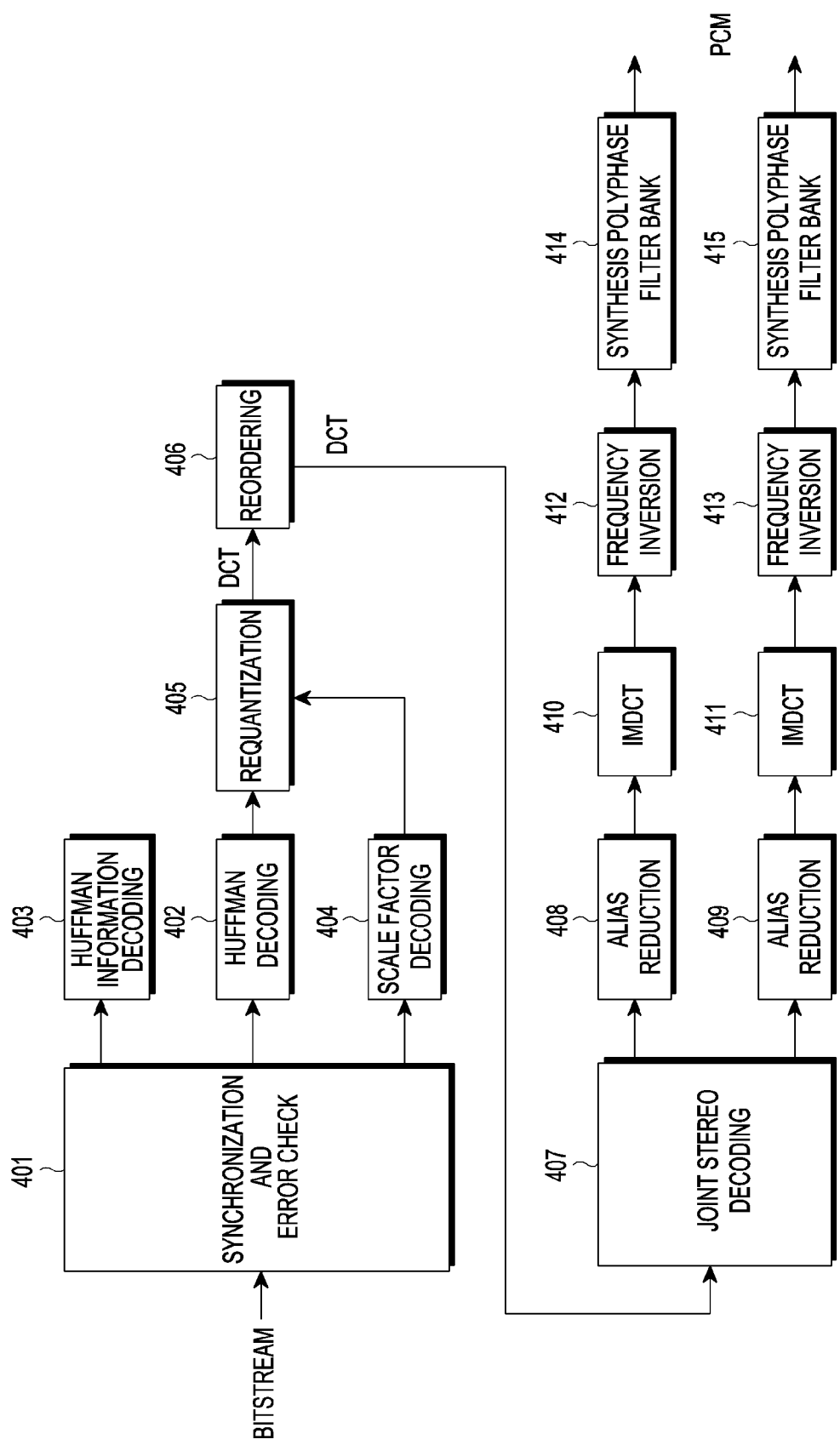
FIG. 4A illustrates a typical process of fully decompressing a frame.

FIG. 4A illustrates a typical process of fully decompressing a frame.

Referring to FIG. 4A, in synchronization and error checking 401, multimedia data transmitted as a bitstream is synchronized, and whether the multimedia data transmitted as a bitstream is erroneous is checked. The multimedia data transmitted as a bitstream may be classified into Huffman code bits, Huffman information, and a scale factor.

The Huffman code bits, the Huffman information, and the scale factor are decoded through Huffman decoding 402, Huffman information decoding 403, and scale factor decoding 404, respectively.

In requantization 405, a frequency line of the decoded data is reconfigured. In reordering 406, if a short window of a sub-band is included, the frequency line is reassembled according to an output sequence of an encoder. In joint stereo decoding 407, left and right audio signals are reconstructed from an audio signal encoded based on the frequency line that has been reassembled through reordering 406. Thus, the audio signals are divided into left and right channels.

Each audio signal, having been divided into left and right channels, is fully decompressed in at least one frame through alias reductions 408 and 409, inverse modified discrete cosine transforms (IMDCTs) 410 and 411, frequency inversions 412 and 413, and synthesis polyphase filter banks 414 and 415.

The full decompression of the frame goes through several processes and thus takes a long time. For example, 15 seconds is required to decompress one MP3 file. In a pre-listening service provided by a sound source provider, the 15 seconds required to decompress one MP3 file is a very long time. Therefore, it is necessary to reduce the required decompression time in order to reduce users' time spent waiting to receive the pre-listening service.

Figure 4B:
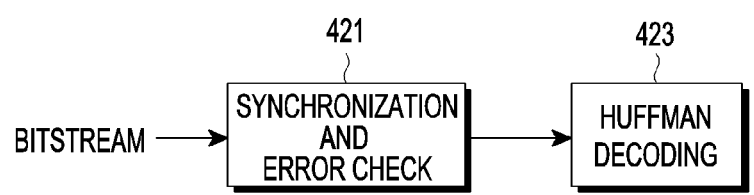
FIG. 4B illustrates a process of partially decompressing at least one frame according to one embodiment of the disclosure.

FIG. 4B illustrates a process of partially decompressing at least one frame according to one embodiment of the disclosure.

Referring to FIG. 4B, from multimedia data transmitted as a bitstream, synchronization and an error are detected in synchronization and error checking 421, and then Huffman information decoding 423 is performed.

Specifically, in synchronization and error checking 421, specific information may be extracted from the multimedia file transmitted as the bitstream. The specific information may include header information, cyclic redundancy check (CRC) information, and side information.

The header information is information which specifies at least one of the type of MP3 file, the bitrate in transmission, and sampling frequencies, and the CRC information is information for the integrity of data. The side information includes parameters necessary for decoding data and a scale factor. A detailed description thereof will be made in the process of extracting metadata parameters.

As illustrated in FIG. 4B, in relation to the partial decompression of the frame, only Huffman information decoding 423 may be performed. Alternatively, only Huffman information decoding 423 and scale factor decoding may be performed.

Therefore, as illustrated in FIG. 4A, even though no processes after the requantization are performed, feature information such as a highlighted part of multimedia data may be obtained.

The method for decompressing a multimedia file according to FIG. 4A requires a large amount of resources and takes a long time. For example, 276.30 seconds is required for full decompression of a multimedia file according to FIG. 4A. However, when the partial decompression method illustrated in FIG. 4B is applied to the same multimedia file, only 3.45 seconds is required for partial decompression thereof. As a result, the partial decompression according to one embodiment of the disclosure has a decompression speed 80 times faster than that of full decompression.

Figure 5A:
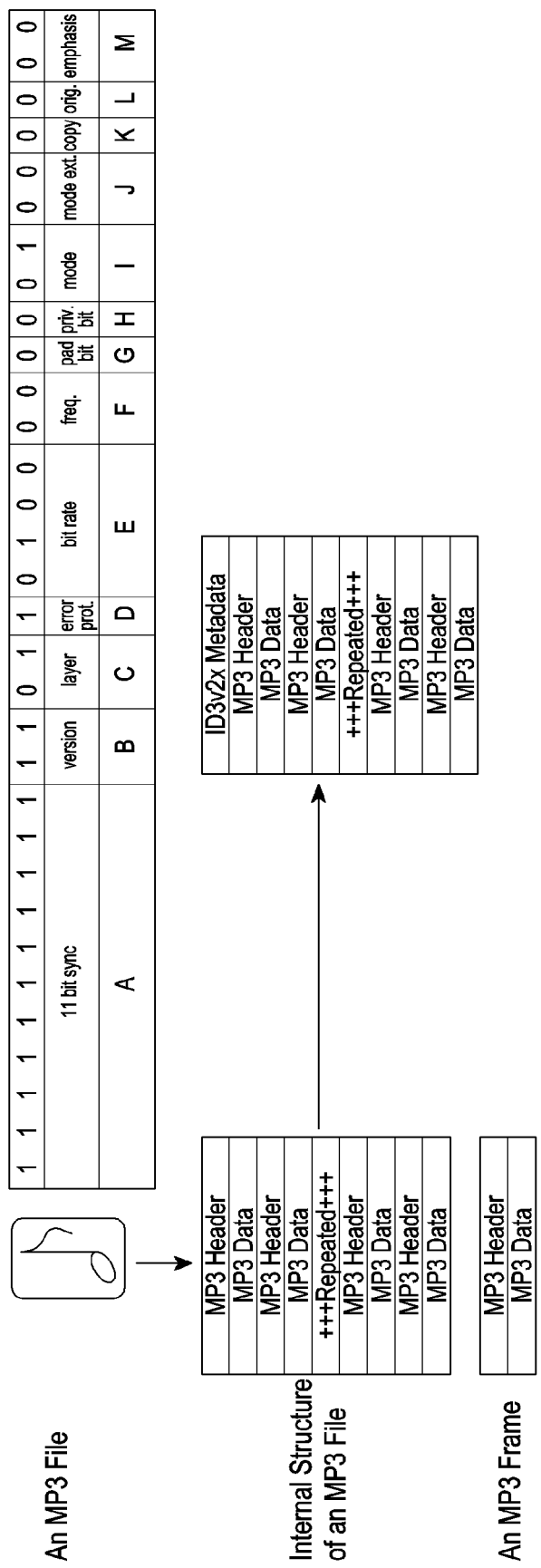
FIG. 5A illustrates a typical structure of an MP3 frame.
Figure 5C:
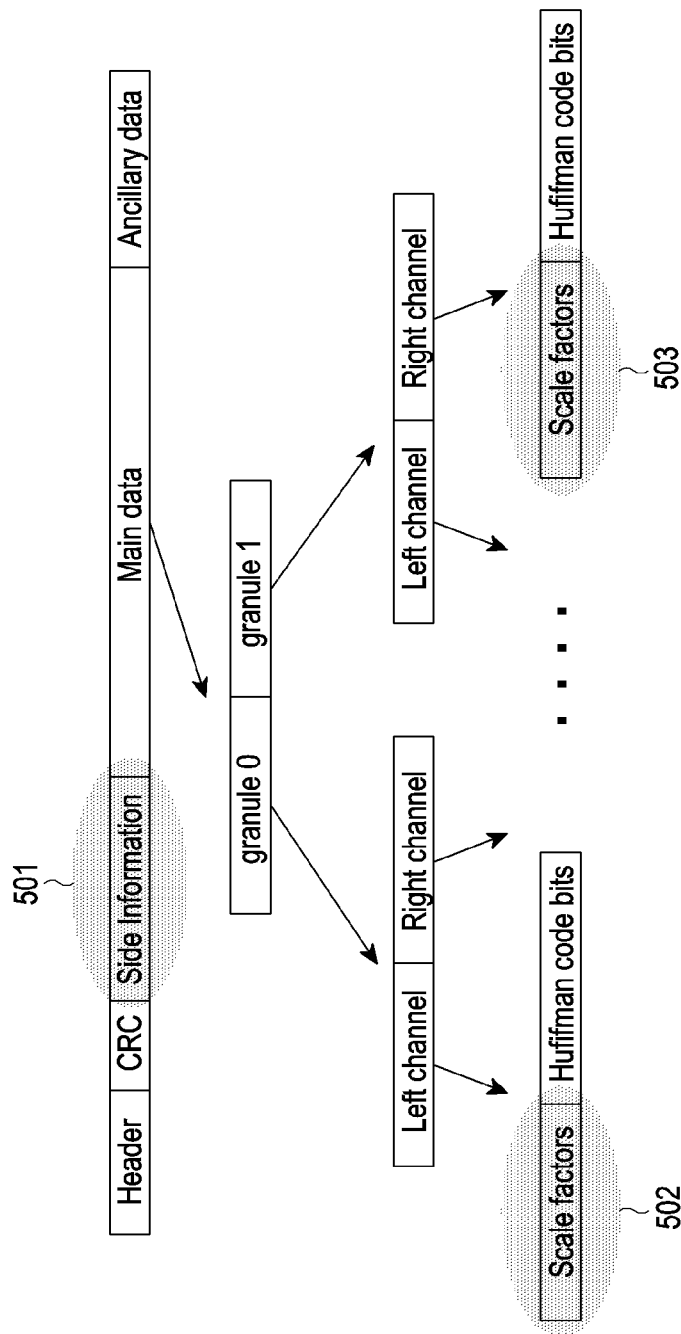
FIG. 5C illustrates a metadata parameter according to one embodiment of the disclosure.

FIG. 5A illustrates the typical structure of an MP3 frame, FIG. 5B illustrates an example of a header field of an MP3 frame, and FIG. 5C illustrates a metadata parameter according to one embodiment of the disclosure.

Before a description is made of a process of extracting a metadata parameter according to one embodiment of the disclosure, the structure of an MP3 frame will be briefly described with reference to FIGS. 5A and 5B.

As illustrated in FIG. 5A, one MP3 file includes an MP3 header and MP3 data. The MP3 file may include multiple MP3 headers and multiple types of MP3 data. The MP3 file may include, as a metatag, 4 bytes of information including location information such as ID3v2x Metadata.

One MP3 frame includes one MP3 header field and one MP3 data field. The MP3 header field may include fields, such as MP3 Sync Word, Version, Layer, Error Protection, Bit Rate, Frequency, Pad. Bit, Priv. Bit, Mode, Mode Extension, Copy, Original, Emphasis, and the like.

FIG. 5B illustrates an example of the MP3 header field in FIG. 5A.

As illustrated in FIG. 5B, when the MP3 header field has FFFBA040 information, Sync Word version indicates MPEG, layer indicates Layer3, error protection indicates No, Bit rate indicates 160, Frequency indicates 44100 Hz, Pad bit indicates "Frame is not padded", Priv Bit indicates Unknown, Mode indicates Joint Stereo, Mode Extension indicates Intensity Stereo Off and MS Stereo Off, Copy indicates "Not Copy-righted", Original indicates Copy of Original Media, and Emphasis indicates None.

In a method for obtaining feature information of multimedia data according to various embodiments of the disclosure, information of all fields illustrated in FIG. 5A may not be used. In the method for obtaining feature information of multimedia data according to various embodiments of the disclosure, necessary information is as illustrated in FIG. 5C.

In the process of extracting metadata parameters, scale factors and side information may be extracted in order to obtain feature information of multimedia data (e.g. a highlighted part of multimedia data).

A frame constituting an MP3 file may be normally divided into five sections. The five sections may include a header, a cyclical redundancy check (CRC), side information, main data, and selected ancillary data.

The main data may correspond to coded audio data and includes a granule0 field and a granule1 field. Each of the granule0 field and the granule1 field includes a left channel field and a right channel field. Further, each of the left channel field and the right channel field includes scale factors and Huffman code bits.

In various embodiments of the disclosure, scale factors 502 and 503 and side information 501 may be used to obtain feature information of multimedia data. In particular, a metadata sequence may be obtained from the scale factors 502 and 503 and the side information 503.

In one example, as shown in Table 1, the metadata sequence may be expressed as a combination of global gain (hereinafter, referred to as "global_gain") values and subblock gain (hereinafter, referred to as "subblock_gain") values.

TABLE 1 global_gain[0][0]+global_gain[0][1]+global_gain[1][0]+
global_gain[1][1] − 4 * (64 +
(
   subblock_gain[0][0][0] + subblock_gain[1][0][0] +
   subblock_gain[2][0][0] +
   subblock_gain[0][0][1] + subblock_gain[1][0][1] +
   subblock_gain[2][0][1] +
   subblock_gain[0][1][0] + subblock_gain[1][1][0] +
   subblock_gain[2][1][0] +
   subblock_gain[0][1][1] + subblock_gain[1][1][1] +
   subblock_gain[2][1][1]
) * 8)

Hereinafter, multi-dimensional arrays of global_gains and subblock_gains are established by left and right channels and first and second granules.

Figure 6:
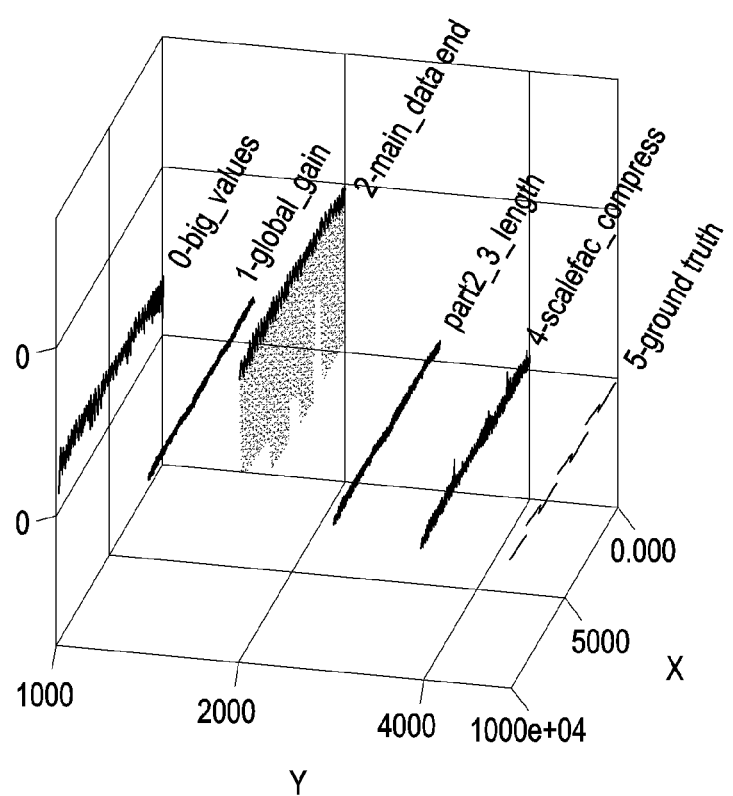
FIG. 6 illustrates a three-dimensional graph expressing values extracted in partial decompression according to one embodiment of the disclosure.

In relation to an actual MP3 file, values extracted in the partial decompression are expressed as a three-dimensional graphic as illustrated in FIG. 6.

Side information includes advanced fields necessary for MP3 decompression. In the example described above, a global_gain and a subblock_gain have been used, but the side information illustrated in time series may include more values. That is, the side information may include a 0-big values field, a 1-global_gain field, a 2-main data end field, a 3-part2_3_length field, a 4-scalefac_compress field, and a 5-ground truth field (pertaining to a main theme determined by an expert).

In the process of obtaining feature information of multimedia data based on at least one metadata parameter, a metadata sequence extracted from scale factors and side information may be used.

For example, the metadata sequence extracted from scale factors and side information may be used in order to determine a highlighted interval of multimedia data. The sum using a sliding window may be considered in order to determine the highlighted interval of multimedia data.

Meanwhile, before a description of determining a highlighted interval of multimedia file according to various embodiments of the disclosure, the process generally used in determining the highlighted interval will be described.

Figure 7A:
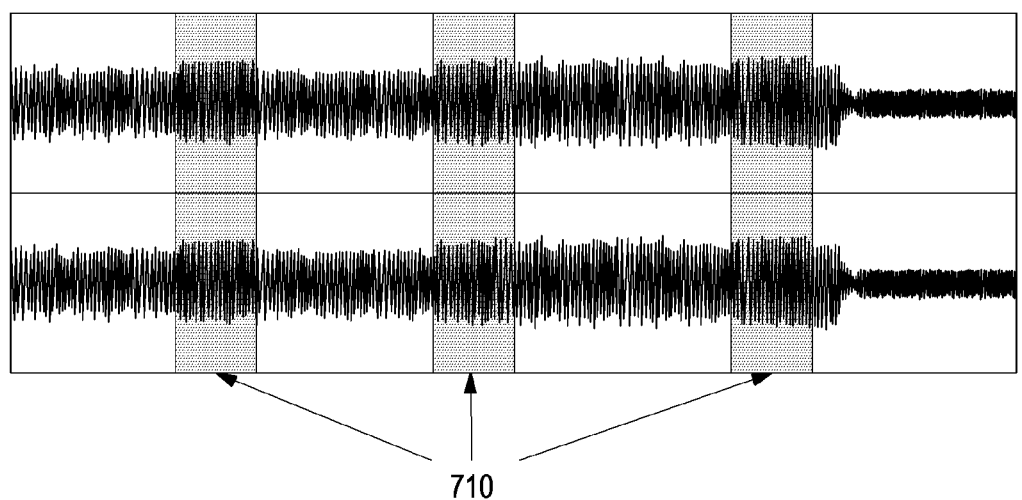
FIG. 7A is a waveform diagram used to search for a highlighted interval based on full decompression.
Figure 7B:
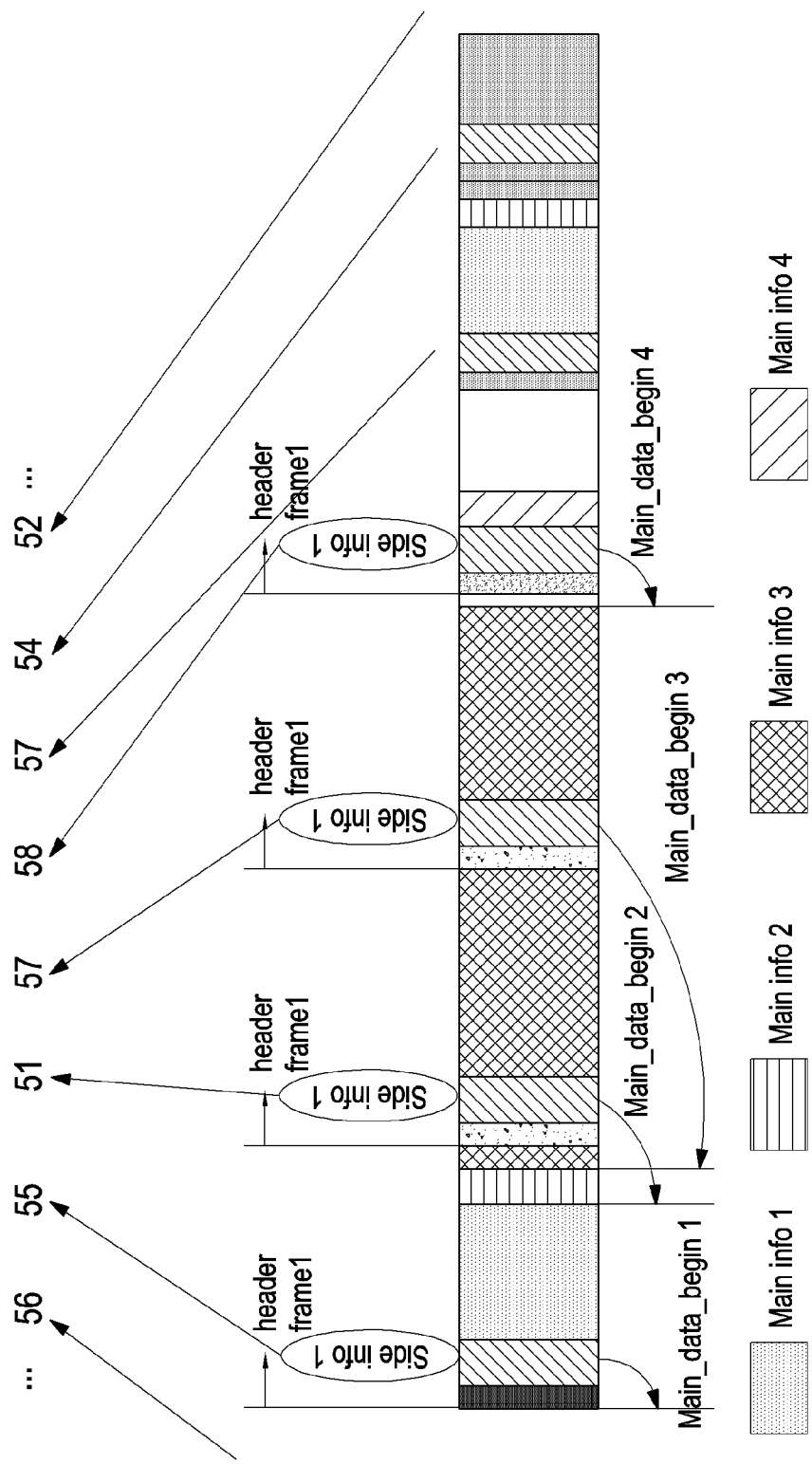
FIG. 7B illustrates a process of determining a highlighted interval by using partial decompression of a multimedia file according to one embodiment of the disclosure.

FIG. 7A is a waveform diagram used to search for a highlighted interval based on full decompression, and FIG. 7B illustrates a process of determining a highlighted interval, using partial decompression of a multimedia file according to one embodiment of the disclosure.

The waveform illustrated in FIG. 7A indicates a waveform that is generated when a sound source file has been fully decompressed and then an A-weighting curve has been applied to the fully decompressed sound source file. In the waveform, the position of a window, at which a sum of root mean squares (RMSs) is maximized, may be founded using a sliding window. As illustrated in FIG. 7A, the waveform may have a large amplitude at a specific part 710 thereof. In order to find one highlighted interval, a sum method for calculating an RMS value of the waveform and using a sliding window may be used.

In an example, a description will be made below of the case where RMS values configured in time series correspond to 56, 55, 51, 57, 58, 57, 54, and 52.

When the sliding window has a size of 4, a first sum corresponds to 56+55+51+57=219. Then, a second sum corresponds to 55+51+57+58=221. A third sum is 223, a fourth sum is 226, and a fifth sum is 221. The largest value is 226, and a part related thereto may be determined as a highlighted interval.

A highlighted interval determination method according to one embodiment of the disclosure will be described with reference to FIG. 7B.

In each frame, a metadata parameter, which is extracted from side information, or the side information and main data and arranged in time series, is used.

In calculating a cumulative sum by using a sliding window, the size of the sliding window may be predetermined as the length of an audio fragment, which is to be regarded as a highlighted interval. For example, a typical MPEG layer III (MP3, version 1) has 1152 samples per frame, and a speed of the samples is normally 44100 Hz. Therefore, (1152/44100)*1000=26 ms per frame. For a highlight duration of 10 seconds, a length of a sliding window should be configured as a value of 10000/26=385.

Therefore, when the sum of first 385 RMS values is calculated, the sliding window moves to a location for summing the next RMS values. Subsequently, the next RMS values are added to the sum of the first 385 RMS values and then the first RMS values are subtracted therefrom.

On the basis of the method as described above, the sum of RMS values for each sliding window may be determined, and a part, at which a cumulative sum result value of RMS values is maximal, is determined as a highlighted interval.

For example, a description will be made of a situation where combination data of global_gain and scale factors is 56, 55, 51, 57, 58, 57, 54, and 52 and the sliding window has a size of 4.

The sum of RMS values (56, 55, 51, and 57) for a first sliding window corresponds to 56+55+51+57=219. The sum of RMS values for the remaining sliding windows are 221, 223, 226, and 221 in subsequence. The largest value there among is 226 and corresponds to the sum of RMS values for a fourth sliding window, and a part related to the value of the sum of RMS values for the fourth sliding window is determined as a highlighted interval.

As described above, the highlighted interval may be determined by loudness. Therefore, using only factors related to loudness is not greatly different in effect from using a fully decompressed multimedia file.

When a highlighted interval is calculated using metadata parameters from partial decompression, the quality of search recognition for the highlighted interval is deteriorated by only 2% in a music collection having 84 music tracks, but the speed thereof may be 80 times faster than a method for fully decompressing a frame.

Filtering may be applied in calculating a sum value by using a sliding window. For example, some MP3 files may have a limit value of a global_gain field in the first 100 MP3 frames thereof. Therefore, the first frame and/or the last frame may be excluded from calculation. In another method, a limit value or the like may be filtered.

Figure 8A:
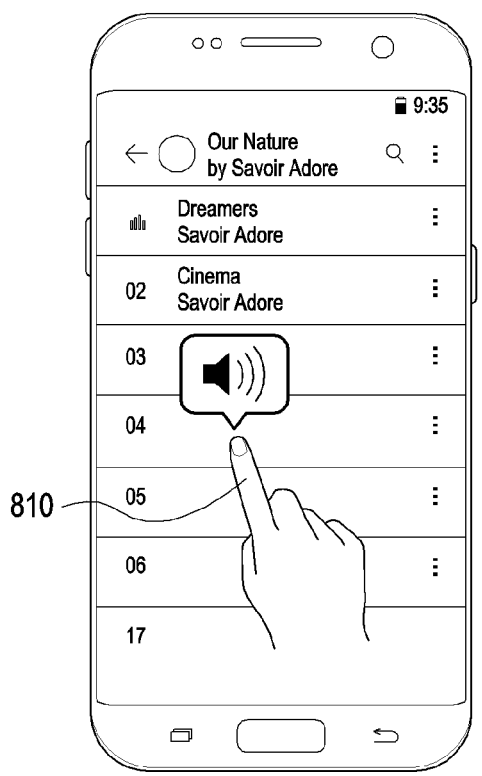
FIGS. 8A and 8B illustrate examples in which a method for searching for a highlighted interval in a multimedia file according to one embodiment of the disclosure has been applied to a mobile device.
Figure 8B:
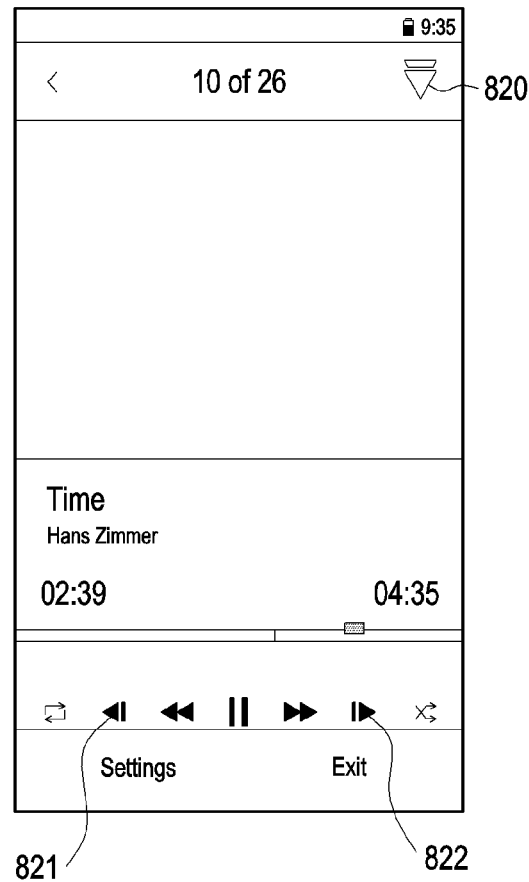

FIGS. 8A and 8B illustrate examples in which a method for searching for a highlighted interval in a multimedia file according to one embodiment of the disclosure has been applied to a mobile device. Referring to FIG. 8A, a user may listen to a sound source of a highlighted interval of an MP3 file merely by hovering 810.

Referring to FIG. 8B, the user may select a next pre-listening button 822 while listening to a highlighted interval corresponding to a specific sound source. In this instance, the highlighted interval of the next sound source may be provided for pre-listening. Further, when the user selects a previous pre-listening button 821, the highlighted interval of the previous sound source may be provided for pre-listening.

The number of highlighted intervals per sound source, i.e., per MP3 file, may not be limited to one. If there is one highlighted interval per MP3 file, the highlighted interval of the next MP3 file may be reproduced when the next pre-listening button 822 is selected. If there are two or more highlighted intervals per MP3 file, the next highlighted interval of the same MP3 file may be reproduced when the next pre-listening button 822 is selected. The user may determine whether to apply a pre-listening function by using a pre-listening on/off button.

Figure 8C:
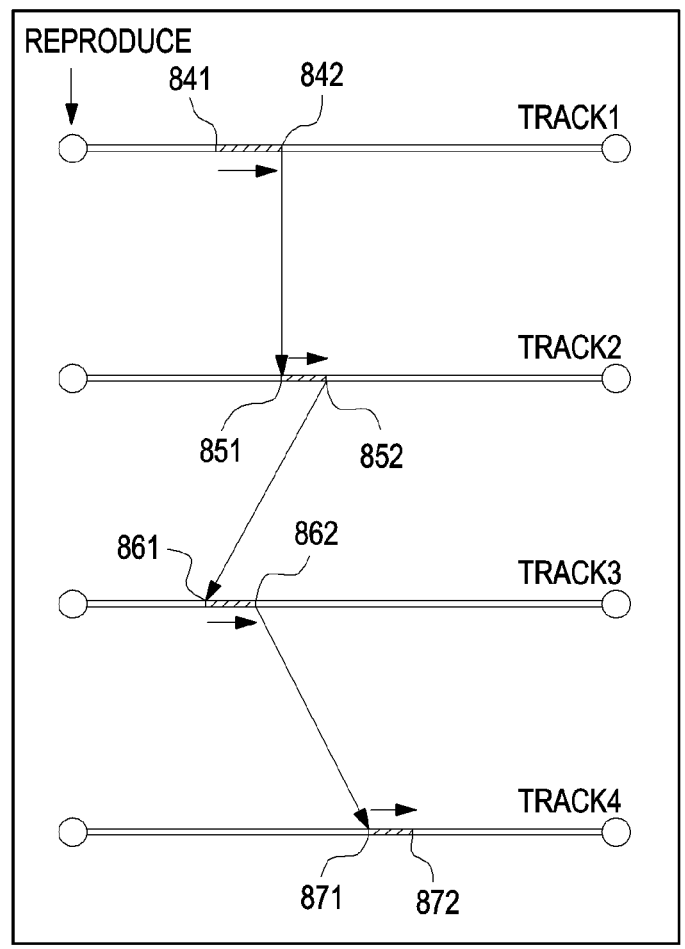
FIG. 8C illustrates one example of a pre-listening service to which a method for searching for a highlighted interval according to one embodiment of the disclosure has been applied.

FIG. 8C illustrates one example of a pre-listening service to which a method for searching for a highlighted interval according to one embodiment of the disclosure has been applied. In sound source track 1 to sound source track 4, reproduction start points 841, 851, 861, and 871 are not fixed. Reproduction end points 842, 852, 862, and 872 may be points spaced a predetermined interval apart from the reproduction start points 841, 851, 861, and 871, respectively. The predetermined interval may be configured in advance or may be determined in various forms.

Figure 9:
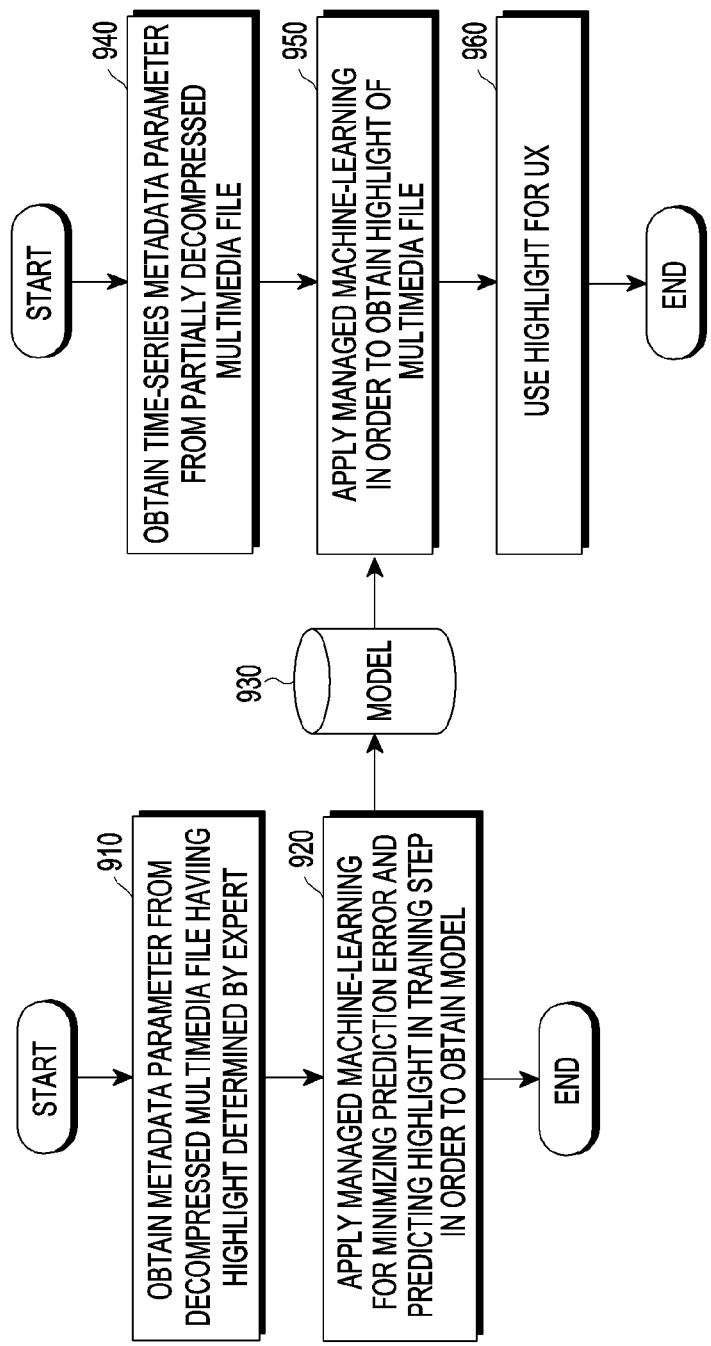
FIG. 9 illustrates another method for obtaining feature information from multimedia data according to one embodiment of the disclosure.

FIG. 9 illustrates another method for obtaining feature information from multimedia data according to one embodiment of the disclosure.

As illustrated in FIG. 9, a managed machine-learning approach may be used. In a learning step, a model 930 is obtained by learning in a training database (a music collection marked up by an expert) 910. In a use step, multimedia data that have been partially decompressed (940) may be processed by a trained machine learning algorithm (950), and, as a result, feature information (e.g. a highlighted interval) of the multimedia data may be obtained (960).

Methods for obtaining feature information from metadata parameters extracted in a partial decompression algorithm may include dynamic time warping, hidden Markov models, neural networks (long short term memory (LSTM) networks, convolution or recurrent such as GRU, deep auto-encoders, etc.), and support vector machines logistic regression, but are not limited thereto.

Figure 10:
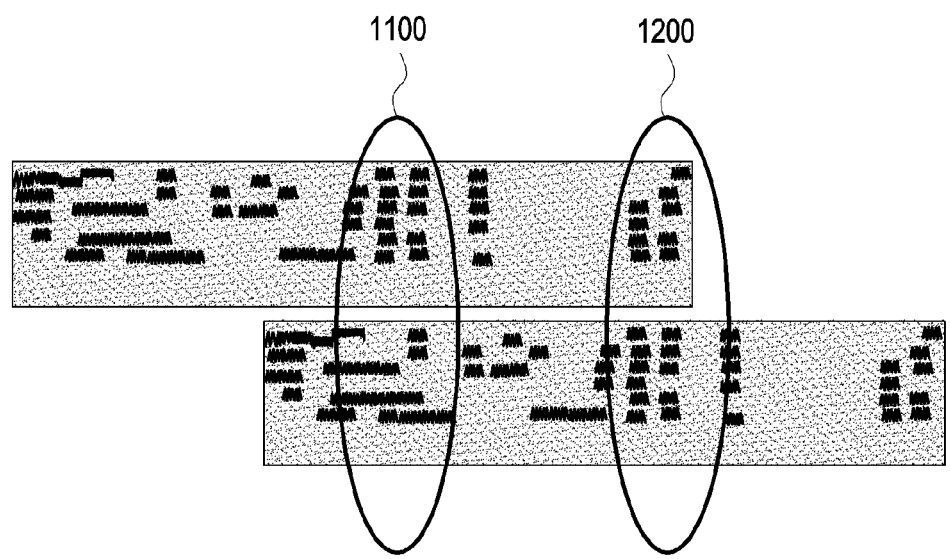
FIG. 10 illustrates another method for obtaining feature information from multimedia data according to one embodiment of the disclosure.

FIG. 10 illustrates another method for obtaining feature information from multimedia data according to one embodiment of the disclosure.

Referring to FIG. 10, in one embodiment of the disclosure, arithmetical calculation is not used but multimedia file similarity analysis may be used in order to obtain feature information of multimedia data. Similarity analysis refers to finding similar parts in one file. For example, in the case of pop/dance sound sources, a song structure normally has a repeating part (chorus). For this reason, by applying signal-processing methods for finding self-similarity in an audio signal, a chorus part in a sound source file is likely to be inferred.

Provided is one example of self-similarity in a sound source file. This is Mel-frequency cepstral coefficients (MFCC) features extracted from a pulse-code-modulation (PCM) file that has not been processed. Similar fragments are illustrated while the same file is shifted.

In relation to partially decompressed data, for example, a Huffman table number depends on a timbre feature of an individual granule in an MP3 frame.

In contrast, clustering may be applied to features describing a sound source file. If clustering is applied, different sounding sound-source fragments are separated. In relation to highlighted intervals, the most frequent cluster may be used for extraction.

Meanwhile, VR highlight detection for a music video clip is possible. That is, highlight detection in VR for users watching a music video clip in VR is possible. Possible interactions between users in VR may be rather limited because the users cannot see their hands performing search work in a time line.

The fact that a music video file includes both a video track and an audio track, which are synchronized, will be obvious to a person skilled in the art. By finding a highlighted interval through the analysis of an audio track and the use of the disclosed method, highlighted intervals of a video image are synchronized with highlights of an audio.

Meanwhile, in various embodiments of the disclosure, a ring tone may be extracted by automatically detecting the most expressive/representative part of a melody. This method may be used when a user can simply extract a ring tone by selecting the loudest sound of a sound source file.

Further, one device may use a near-field communication (NFC) beam (S-beam) to transfer a sound source file to another device, and sound source pre-listening may be performed in the another device.

One device may generate a thumbnail from a music video based on sound source highlighted interval extraction. An example of use of a thumbnail of a video, as shown in NFC beam sharing, is a combination of a pre-listening music usage example and a video thumbnail generation usage example. The user can view a highlight of the video in another device. This function may be possible due to the very high validity of the disclosed algorithm.

Additionally, a device may determine the tempo characteristics (e.g. beats per minute (BPM) information) of a sound source by using metadata parameters extracted from a partially decompressed frame. For example, the device may determine the BPM of a sound source track based on a global_gain value for each frame. Further, the device may determine the BPM by measuring the frequency of vibrations caused due to the rhythm characteristics of a sound source based on FFT, autocorrelation, or other schemes for frequency analysis. When the metadata parameters, such as Huffman code table numbers and discrete cosine transform (DCT) coefficients, are extracted from the partially decompressed frame, the accuracy of BPM determination may be further increased.

Meanwhile, the device may extract DCT coefficients in the partial decompression step, and may extract a key constituting a sound source on the basis of the extracted DCT coefficients. In this instance, the device may mix the determined BPM and the extracted key and may then continuously reproduce the mixed BPM and key.

The device may obtain multimedia fingerprinting related to multimedia data by using the metadata parameters extracted from the partially decompressed frame. The device may calculate a hash value for data deduplication between multimedia frames or between multimedia files based on the obtained multimedia fingerprinting. Further, the device may search for information associated with the multimedia data based on the obtained multimedia fingerprinting.

For example, when a user has a multimedia file that has no name or tag, the device may extract multimedia fingerprinting and then transmit the fingerprinting to a server. Then, the server searches a database for the name and the tag based on the multimedia fingerprinting, and then transmits the found name and tag to the device. If the user has file 1.mp3, multimedia fingerprinting is extracted from file 1.mp3 and is then transmitted to the server, and a tag for the file, as in psy-gangnamstyle.mp3, may be received from the server.

Figure 11:
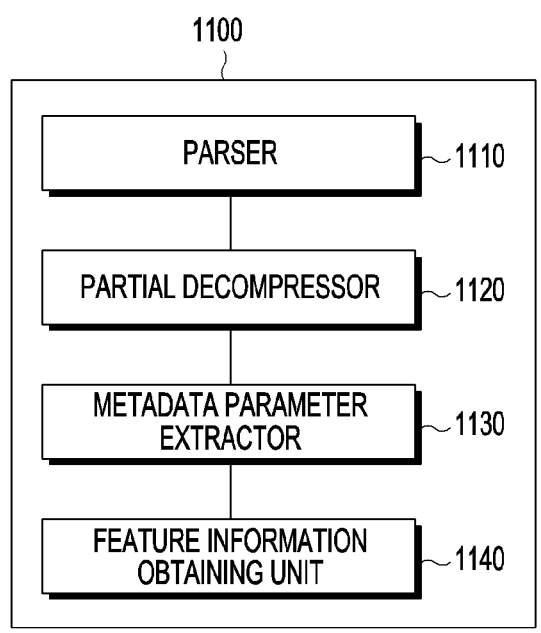
FIG. 11 illustrates the inner configuration of a device according to one embodiment of the disclosure.

FIG. 11 illustrates the inner configuration of a device according to one embodiment of the disclosure.

Referring to FIG. 11, a device 1100 or controller 1100 configured to perform a method according to one embodiment of the disclosure includes a parser 1110, a partial decompressor 1120, a metadata parameter extractor 1130, and a feature information obtaining unit 1140.

The parser 1110 performs process 320 in FIG. 3 of parsing multimedia data into at least one frame. The partial decompressor 1120 performs process 320 in FIG. 3 of partially decompressing the at least one frame. The metadata parameter extractor 1130 performs process 330 of extracting at least one metadata parameter from the at least one frame that has been partially decompressed. The feature information obtaining unit 1140 performs process 340 in FIG. 3 of obtaining feature information on the basis of the at least one metadata parameter. Detailed description is as described in FIG. 3.

The controller including the parser 1110, the partial decompressor 1120, the metadata parameter extractor 1130, and the feature information obtaining unit 1140 may be operated by at least one processor.

It should be noted that exemplified images shown in FIGS. 2 to 11 are not intended to limit the scope of the disclosure. That is, it should not be construed that all element units or operations shown in FIGS. 2 to 11 are essential elements for implementing the disclosure, that is, only some elements may be used to implement the disclosure, without departing from the subject matter of the disclosure.

A PC, a mobile device, or the like may perform the operations described above by reading and executing program code stored in a memory unit through a processor, a controller, or a central processing unit (CPU).

According to various embodiments of the disclosure, various types of feature information related to multimedia data may be obtained.

According to various embodiments of the disclosure, a highlighted part of multimedia data may be found more simply and quickly than when using conventional methods.

According to various embodiments of the disclosure, a sound source frame is not fully decompressed but is partially decompressed, thus enabling a highlighted part to be found more quickly. In addition, the partial decompression of the sound source frame may reduce memory usage.

According to various embodiments of the disclosure, because the highlighted part is not designated by a user, the highlighted part may be found in all sound source files regardless of the unpopularity/rarity thereof, and an invasion of privacy may be prevented from occurring.

Meanwhile, while the disclosure has been shown and described in detail with reference to specific embodiments thereof, it goes without saying that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method of processing multimedia data, the method comprising:
   parsing the multimedia data into frames;
   partially decompressing the frames;
   extracting at least two metadata parameters from each of the partially decompressed frames, the at least two metadata parameters including side information and scale factors;
   identifying a root mean square (RMS) value for each of the partially decompressed frames based on the extracted at least two metadata parameters;
   determining a sum of at least one RMS;
   obtaining feature information related to a highlighted part of the multimedia data based on a maximum sum among the sum determined for each sliding window; and
   determining, as the highlighted part, at least one frame corresponding to a sliding window having the maximum sum among the sum for the each sliding window.

2. The method of claim 1, wherein if the multimedia data is multimedia data encoded based on a Motion Picture Expert Group (MPEG)-1 Audio Layer III (MP3) encoding scheme.

3. The method of claim 1, wherein the side information is included in a global_gain field of each of the partially decompressed frames, and the scale factors are included in a scale_factors field of each of the partially decompressed frames.

4. The method of claim 1, wherein the obtaining of the feature information comprises obtaining a tempo characteristic of the multimedia data.

5. The method of claim 1, wherein the obtaining of the feature information comprises obtaining multimedia fingerprinting related to the multimedia data.

6. The method of claim 5, further comprising calculating a hash value for multimedia data deduplication, based on the multimedia fingerprinting.

7. The method of claim 5, further comprising searching for information associated with the multimedia data, based on the multimedia fingerprinting.

8. The method of claim 1, wherein the obtaining of the feature information comprises obtaining at least one among a thumbnail corresponding to the highlighted part of the multimedia data, a video source synchronized with an audio source of the multimedia data, and summary information of the multimedia data.

9. An apparatus for processing multimedia data, the apparatus comprising:
   at least one processor configured to:
      parse the multimedia data into frames,
      partially decompress the frames,
      extract at least two metadata parameters from each of the partially decompressed frames, the at least two metadata parameters including side information and scale factors, identify a root mean square (RMS) value for each of the partially decompressed frames based on the extracted at least two metadata parameters, determine a sum of at least one RMS value for at least one frame included in each sliding window having a predetermined time interval, among the partially decompressed frames, obtain feature information related to a highlighted part of the multimedia data based on a maximum sum among the sum determined for the each sliding window, and determine, as the highlighted part, at least one frame corresponding to a sliding window having the maximum sum among the sum for the each sliding window.

10. The apparatus of claim 9, wherein the multimedia data is multimedia data encoded based on a Motion Picture Expert Group (MPEG)-1 Audio Layer III (MP3) encoding scheme.

11. The apparatus of claim 9, wherein the side information is included in a global_gain field of each of the partially decompressed frames, and the scale factors are included in a scale_factors field of each of the partially decompressed frames.

12. The apparatus of claim 9, wherein the at least one processor is further configured to obtain a tempo characteristic of the multimedia data.

13. The apparatus of claim 9, wherein the at least one processor is further configured to obtain multimedia fingerprinting related to the multimedia data.

14. The apparatus of claim 13, wherein the at least one processor is further configured to calculate a hash value for multimedia data deduplication, based on the multimedia fingerprinting.

15. The apparatus of claim 13, wherein the at least one processor is further configured to search for information associated with the multimedia data, based on the multimedia fingerprinting.

16. The apparatus of claim 9, wherein the at least one processor is further configured to obtain at least one among a thumbnail corresponding to the highlighted part of the multimedia data, a video source synchronized with an audio source of the multimedia data, and summary information of the multimedia data.

* * * * *